(12) United States Patent
Ueyama

(10) Patent No.: US 6,215,218 B1
(45) Date of Patent: Apr. 10, 2001

(54) CONTROL MAGNETIC BEARING

(75) Inventor: Hirochika Ueyama, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/288,039

(22) Filed: Apr. 8, 1999

(30) Foreign Application Priority Data

| Apr. 9, 1998 | (JP) | 10-97555 |
| Apr. 15, 1998 | (JP) | 10-104578 |
| Apr. 27, 1998 | (JP) | 10-116433 |
| Apr. 28, 1998 | (JP) | 10-118448 |

(51) Int. Cl.$^7$ ............... H02K 7/09; F16C 32/04
(52) U.S. Cl. ............... 310/90.5
(58) Field of Search ............... 310/90.5; 700/28, 700/30, 31, 32, 52

(56) References Cited

U.S. PATENT DOCUMENTS

| 4,540,262 | * | 9/1985 | Nakai et al. ............ 396/147 |
| 4,583,031 | * | 4/1986 | Brunet et al. ........... 318/632 |
| 4,970,638 | * | 11/1990 | Yeh et al. ............... 700/30 |
| 5,387,851 | * | 2/1995 | Nuscheler et al. ...... 318/135 |
| 5,394,327 | * | 2/1995 | Simon, Jr. et al. ..... 700/47 |
| 5,627,421 |   | 5/1997 | Miller et al. .......... 310/90.5 |
| 5,998,899 | * | 12/1999 | Rosen et al. .......... 310/90.5 |

FOREIGN PATENT DOCUMENTS

| 0 464 571 A1 | 1/1992 | (EP) . |
| 4-252883 | 9/1992 | (JP) . |
| 8-270651 | 10/1996 | (JP) . |
| 9-177781 | 7/1997 | (JP) . |
| 9-189327 | 7/1997 | (JP) . |
| 2565155 | 12/1997 | (JP) . |

OTHER PUBLICATIONS

Roland Y. Siegwart et al., "Identification and Monitoring of Turbo Rotors in Active Magnetic Bearings", International Gas Turbine and Aeroengine Congress and Exposition, The Hague, Netherlands, Jun. 13–16, 1994, pp. 1–6.

* cited by examiner

Primary Examiner—Karl Tamai
(74) Attorney, Agent, or Firm—McGinn & Gibb, PLLC

(57) ABSTRACT

A control magnetic bearing includes a mechanical main unit and a controller for controlling an excitation current supplied to electromagnets. The mechanical main unit comprises displacement sensors and magnetic bearing sets for supporting a rotor in a non-contacting manner. The controller is provided with a digital signal processor (DSP) which outputs a digital control signal for controlling the excitation current on the basis of a digital displacement signal. The DSP includes identification unit for identifying the type of the mechanical main unit. The identification unit identifies the type of the mechanical main unit on the basis of the response by the rotator.

26 Claims, 10 Drawing Sheets

CONTROL MAGNETIC BEARING

BACKGROUND OF THE INVENTION

1) Field of the Invention

The present invention relates to a control magnetic bearing which is used in a turbo-molecular pump and rotates a rotator without the rotator and the magnetic bearing making any physical contact.

2) Description of Related Art

A control magnetic bearing of this type comprises a mechanical main unit and a controller connected to the main unit by way of a cable.

The mechanical main unit comprises a plurality of displacement sensors for detecting axial and radial displacements of the rotator; plural sets of magnetic bearings for supporting the rotator in both the axial and the radial directions using attractive magnetic forces generated by a pair of electromagnets that constitute each of the magnetic bearings; an electric motor for rotating the rotator; and a protective bearing for limiting a movable range of the rotator. The protective bearing limits the movable range of the rotator in both the axial and radial directions and mechanically supports the rotator when the magnetic bearings lose magnetic forces to support the rotator.

The controller controls an excitation current supplied to the electromagnets, in response to signals output form the displacement sensors and through the use of predetermined control parameters.

The mechanical main unit of such magnetic bearing differs in type according to the application of the magnetic bearing. When the mechanical main unit is changed to another type, control parameters used by the controller must also be changed. The type of the mechanical main unit differs according to the characteristics of the rotator (such as the weight, characteristics frequency, and position of the center gravity of the rotator), the type of electromagnet, and the positional relationships among the rotator, the electromagnets, and the displacement sensors. For this reason, traditionally there have been prepared a plurality of different types of mechanical main units and a plurality of different types of controllers employing different control parameters. The mechanical main units and the controllers are used in combination according to the application.

However, such a traditional practice is uneconomical in that it requires plural types of controllers to conform with the types of the mechanical main unit. The erroneous combination of the mechanical main unit and the controller may make unstable the positional control of the rotator by the magnetic bearings control since parameters set in the controller are not suitable for use with the magnetic bearing. To prevent such unstable positional control of the rotator, desirably the controller automatically identifies the type of the mechanical main unit when it is connected to the mechanical main unit, and checks whether or not the controller is suitable for use with the thus-connected mechanical main unit. The magnetic bearings primarily employ an analog PID control method as a control method for the controllers. Further, the controllers have only the function of outputting a signal to the electromagnets in response to the signals received from the displacement sensors. Thus, the controllers have been unable to identify the type of the mechanical main unit.

SUMMARY OF THE INVENTION

The object of the present invention is to provide a control magnetic bearing capable of automatically identifying the type of a mechanical main unit.

Another object of the present invention is to provide a control magnetic bearing capable of changing a control parameter SET according to the type of a mechanical main unit.

Accordingly, the present invention provides a control magnetic bearing including a mechanical main unit which has a plurality of displacement sensors for detecting displacement of a rotator and a plurality of sets of magnetic bearings for supporting the rotator in a predetermined target position in a non-contacting manner by means of the magnetic forces of attraction generated by a pair of electromagnets that constitute each of the magnetic bearings; and a controller having electromagnetic control means for controlling an excitation current supplied to the electromagnets on the basis of signals output from the displacement sensors, wherein the electromagnet control means has digital processing means which can be programmed by means of software and outputs a digital control signal for controlling the excitation current on the basis of the digital displacement signal that is calculated from the signals output from the displacement sensors and represents the displacement of the rotator; and the digital processing means has identification means for identifying the type of the mechanical main unit.

The present invention also provides a control magnetic bearing including a mechanical main unit which has a plurality of displacement sensors for detecting displacement of a rotator, and a plurality of sets of magnetic bearings for supporting the rotator in a predetermined target position in a non-contacting manner by means of the magnetic forces of attraction generated by a pair of electromagnets that constitute each of the magnetic bearings; and a controller having electromagnet control means for controlling an excitation current supplied to the electromagnets on the basis of signals output from the displacement sensors, wherein the electromagnet control means has a nonvolatile storage device and digital processing means which can be programmed by means of software, and outputs a digital control signal for controlling the excitation current on the basis of the digital displacement signal that is calculated from the signals output from the displacement sensors and represents the displacement of the rotator;

the nonvolatile storage device stores control parameters for identification purposes and a plurality of sets of operation control parameters corresponding to the individual types of mechanical main units; and the digital processing means has identification means for identifying the type of the mechanical main unit and selecting the set of control parameters corresponding to the result of such identification from the nonvolatile storage device.

By means of the foregoing configuration, the type of the mechanical main unit can be identified, and, on the basis of the result of such identification, a check can be made as to whether or not the controller is compatible with the mechanical main unit.

On the basis of the result of identification of the mechanical main unit, an operation control parameter set suitable for the mechanical main unit can be automatically selected from the plurality of sets of operation control parameters stored in the nonvolatile storage device, an subsequently used. As a result, one type of controller may be used with a plurality of types of mechanical main units, thus reducing the number of types of controllers provided to the magnetic bearing and hence rendering the magnetic bearing economical.

The digital processing means capable of being programmed by means of software comprises, e.g., a microprocessor (MPU) or a digital signal processor. The digital signal processor designates hardware which enables input and output of a digital signal, can be programmed by means of software, and is specifically designed so as to be able to perform high-speed processing operations. The digital signal processor will be hereinafter simply abbreviated "DSP."

Flash memory, EPROM, or any other suitable storage device may be used as the nonvolatile storage device.

According to one aspect of the present invention, the identification means changes the target position after the rotator has been supported in the target position in a non-contacting manner. On the basis of the response by the rotator, the identification means identifies the type of the mechanical main unit.

Response—which denotes the action of the rotator when the target position of the rotator is changed—varies according to the type of the mechanical main unit. Consequently, the type of the mechanical main unit may be identified by examination of the response by the rotator upon changing of the target position. The type of mechanical main unit can be automatically identified by means of the electromagnet control means of the controller. On the basis of the result of such identification, the controller can check whether or not the controller is compatible with the mechanical main unit.

Preferably, the identification means changes the target position of the rotator by addition of a predetermined digital identification signal to the digital displacement signal, and calculates from the digital displacement signal the response by the rotator upon changing of the target position.

As a result, the target position can be readily changed by addition of only the digital signal.

Preferably, the digital identification signal is a step waveform signal.

A transient response by the rotator varies according to the type of the mechanical main unit. Consequently, the type of the mechanical main unit can be identified by changing a target value stepwise through addition of a step waveform signal to the digital displacement signal and by examination of a response (transient response) by the rotator upon changing of a target value.

Preferably, the digital identification signal is a sinusoidal signal of constant frequency.

Preferably, the digital identification signal is a sinusoidal signal of variable frequency.

Frequency response by the rotator varies according to the type of the mechanical main unit. Consequently, the type of the mechanical main unit can be identified by periodically changing a target value through addition of a sinusoidal signal to the digital displacement signal and by examination of a response (frequency response) by the rotator upon changing of the target value. Particularly, in a case where a sinusoidal signal of variable frequency is used, the type of the mechanical main unit can be correctly identified by examination of the frequency response corresponding to the plurality of sinusoidal signals of different frequencies.

According to a second aspect of the present invention, after having supported the rotator in a predetermined target position in a non-contacting manner, the identification means excites the rotator and identifies the type of the mechanical main unit on the basis of the response by the rotator upon excitation.

Response—which denotes action of the rotator upon excitation—varies according to the type of the mechanical main unit. Consequently, the type of the mechanical main unit may be identified by examination of the response by the rotator made upon excitation of the target position. The type of mechanical main unit can be automatically identified by means of the electromagnet control means of the controller. On the basis of the result of such identification, the controller can check whether or not the controller is compatible with the mechanical main unit.

Preferably, the identification means excites the rotator by addition of a predetermined digital identification signal to the digital control signal, and calculates from the digital displacement signal the response by the rotator upon excitation.

As a result, the rotator can be readily excited by addition of only the digital signal.

Preferably, the digital identification signal is a sinusoidal signal of constant frequency.

Preferably, the digital identification signal is a sinusoidal signal of variable frequency.

Frequency response by the rotator varies according to the type of the mechanical main unit. Consequently, the type of the mechanical main unit can be identified by excitation of the rotator through addition of a sinusoidal signal to the digital control signal and by examination of a response (frequency response) by the rotator upon excitation. Particularly, in a case where a sinusoidal signal of variable frequency is used, the type of the mechanical main unit can be correctly identified by examination of the frequency responses corresponding to the plurality of sinusoidal signals of different frequencies.

According to a third aspect of the present invention, the identification means identifies the type of the mechanical main unit on the basis of the response by the rotator when the rotator in a contact supported state (in which the rotator is not supported by the magnetic bearing sets in a non-contacting manner) is supported in a predetermined location by means of the magnetic bearing sets in a non-contacting manner.

Transient response by the rotator varies according to the type of the mechanical main unit. Response by the rotator when the rotator in a contact supported state is supported in a target position in a non-contacting manner is the same as transient response. The type of the mechanical main unit can be identified by examination of the response by the rotator at this time. Consequently, the electromagnet control means of the controller can automatically identify the type of the mechanical main unit. On the basis of such identification, a check can be made as to whether or not the controller is compatible with the mechanical main unit. When the operation of the magnetic bearing is commenced, the rotator in the contact supported state must inevitably be supported in a target position in a non-contacting manner, and hence the type of the mechanical main unit can be identified during the course of operations inevitable for starting the operation of the magnetic bearing, thereby eliminating a special operation, which would otherwise be required for identifying the type of the mechanical main unit.

Preferably, the identification means calculates the response by the rotator from the digital displacement signal when the rotator in the contact supported state is supported in a target position in a non-contacting manner.

As a result, the type of the mechanical main unit can be identified through use of the digital displacement signal required for controlling the excitation current supplied to electromagnet, thus eliminating special sensors, which would otherwise be required for identification purposes.

According to a fourth aspect of the present invention, the identification means identifies the type of the mechanical main unit on the basis of an integral component of the digital control signal obtained when the rotator is supported in a target position by the magnetic bearing sets in a non-contacting manner.

The integral component of the control signal, which is obtained when the rotator is supported in a target position in a non-contacting manner by means of the magnetic bearing sets, varies according to the type of the mechanical main unit. The type of the mechanical main unit can be identified by examination of the integral component of the control signal upon changing of the integral component. Consequently, the electromagnet control means of the controller can automatically identify the type of the mechanical main unit. On the basis of the result of such identification, a check can be made as to whether or not the controller is compatible with the mechanical main unit. When the operation of the magnetic bearing is commenced, the rotator must inevitably be supported in a target position in a non-contacting manner, and hence the type of the mechanical main unit can be identified during the course of the operations inevitable for commencing the operation of the magnetic bearing, thus eliminating a special operation, which would otherwise be required for identification.

DESCRIPTION OF THE PREFERRED EMBODIMENTS

First Embodiment

Figure 1:
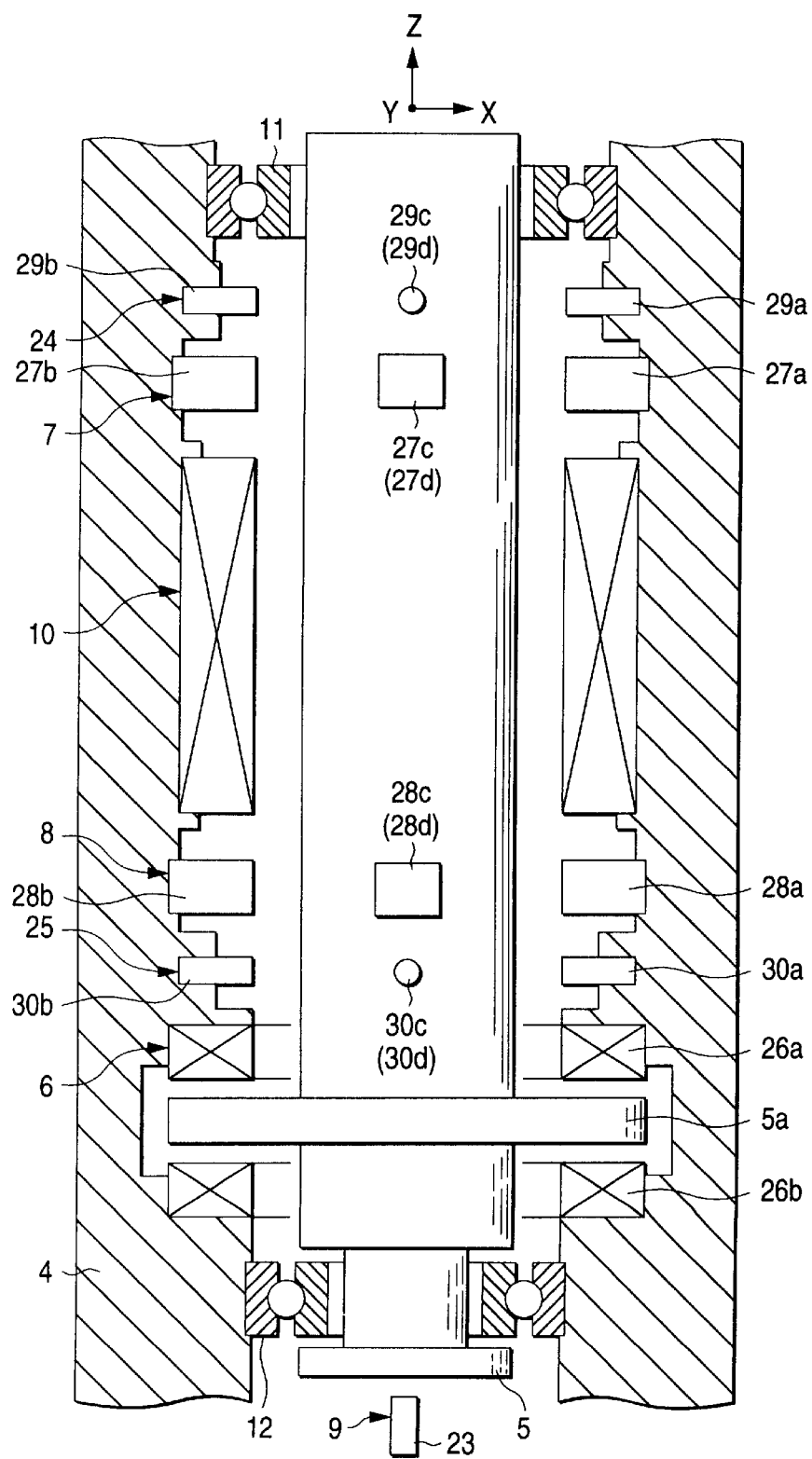
FIG. 1 is a longitudinal cross-sectional view showing the principal mechanical portions of a magnetic bearing according to a first embodiment of the present invention.
Figure 2:
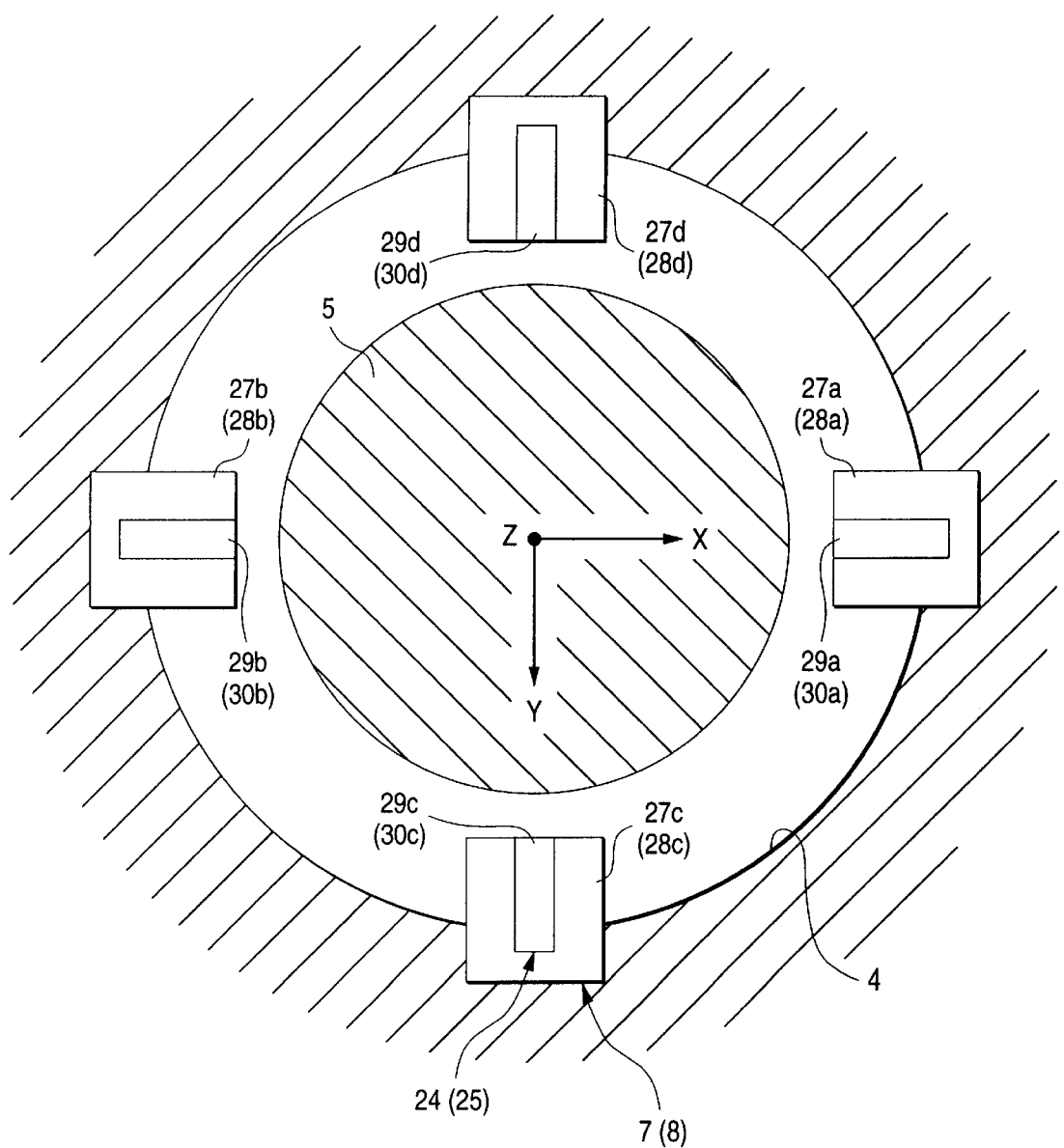
FIG. 2 is a transverse cross-sectional view showing the same.
Figure 3:
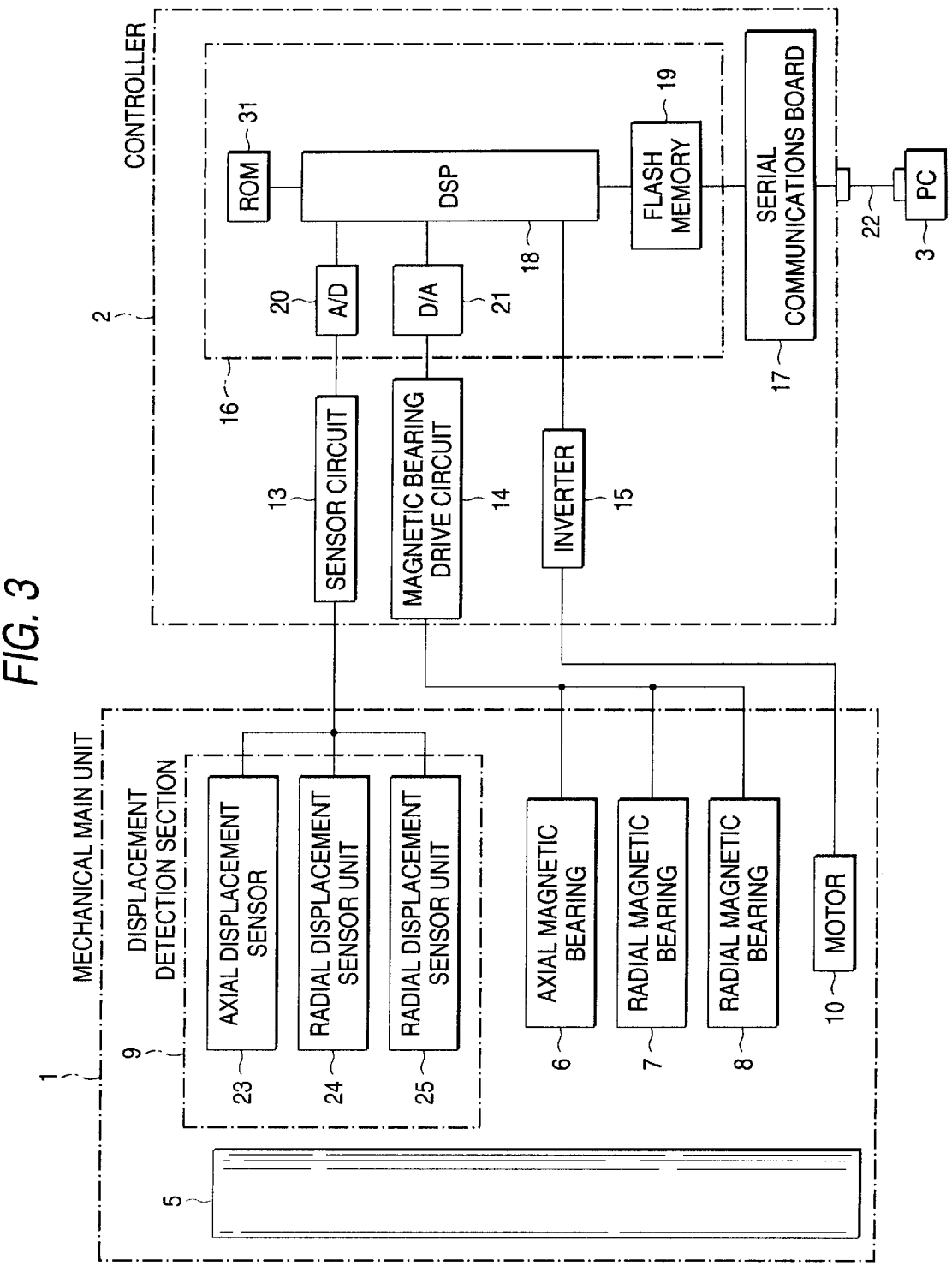
FIG. 3 is a block diagram showing an example of electric configuration of the magnetic bearing.

FIG. 1 is a longitudinal cross-sectional view showing the principal mechanical elements of a controlled magnetic bearing; FIG. 2 is a lateral cross-sectional view showing the same; and FIG. 3 is a block diagram showing one example of the electrical configuration of the magnetic bearing.

The magnetic bearing comprises a mechanical main unit 1 which is connected to a controller 2 via a cable, and the controller 2 is connected to a personal computer 3.

The magnetic bearing is of longitudinal type, i.e. designed such that a vertically-set, shaft-like rotator 5 rotates within a vertically-set, cylindrical casing 4. The control axis (or an axial control axis) aligned in the axial direction of the rotator 5 (or the vertical direction thereof) is taken as the Z axis. Two control axes (radial control axes) aligned in respective radial directions (in the horizontal direction) that cross each other and the Z axis at right angles are taken as the X and Y axes.

The mechanical main unit 1 comprises a set of axial magnetic bearings 6 for axially supporting the rotator 5 in a non-contacting manner; an upper radial magnetic bearing set 7 and a lower radial magnetic bearing set 8 both for radially supporting the rotator 5 in a non-contacting manner; a displacement detection section 9 for detecting the axial and radial displacements of the rotator 5; a built-in electric motor 10 for rotating the rotator 5 at high speed; and an upper protective bearing set 11 and a lower protective bearing set 12 both for limiting the movable range of the rotator 5 in both the axial and radial directions and which mechanically support the rotator 5 at either of the limiting positions of the movable range when the magnetic bearing sets 6, 7, and 8 fail to support the rotator 5.

The controller 2 comprises a sensor circuit 14, a magnetic bearing drive circuit 14, an inverter 15, a DSP board 16, and a serial communications board 17. The DSP board 16 comprises a DSP 18 serving as digital processor; ROM 31; flash memory 19 serving as a nonvolatile storage device; an analog-to-digital converter 20, and a digital-to-analog converter 21. The controller 2 and the personal computer 3 are placed in respective remote positions. The flash memory 19 and the personal computer 3 are connected together by way of the communications board 17 and the cable 21.

The displacement detection section 9 comprises an axial displacement sensor 23 for detecting the axial displacement of the rotator 5; and an upper radial displacement unit 24 and a lower radial displacement unit 25 for detecting the radial displacement of the rotator 5.

The axial magnetic bearing set 6 comprises a pair of axial electromagnets 26a and 26b provided such that a flange 5a formed integrally with a lower portion of the rotator 5 is sandwiched between the axial electromagnets 26a and 26b are collectively designated by reference numeral 26.

The axial displacement sensor 23 is disposed so as to face the lower end face of the rotator 5 from below in the Z-axis direction and outputs a distance signal proportional to the distance (or clearance) between the axial displacement sensor 23 and the lower end of the rotator 5.

The two sets of radial magnetic bearing sets 7 and 8 are provided in elevated positions with respect to the axial magnetic bearing set 6 so as to be vertically spaced a given distance apart from each other. The electric motor 10 is interposed between the radial magnetic bearing sets 7 and 8. The upper radial magnetic bearing set 7 comprises a pair of radial electromagnets 27a and 27b positioned such that the rotator 5 is sandwiched therebetween in the X-axis direction; and another pair of radial electromagnets 27c and 27d positioned such that the rotator 5 is sandwiched therebetween in the Y-axis direction. These radial electromagnets 27a to 27d are collectively designated by reference numeral 27. Similarly, the lower radial electromagnetic bearing 8 comprises two pairs of radial electromagnets 28a, 28b, 28c, and 28d. These radial electromagnets 28a to 28d are collectively designated by reference numeral 28.

The upper radial displacement sensor 24 is positioned in the vicinity of the upper radial magnetic bearing set 7 and comprises a pair of radial displacement sensors 29a and 29b positioned in the vicinity of the respective electromagnets 27a and 27b such that the rotor 5 is sandwiched between the radial displacement sensors 29a and 29b in the X-axis direction, and another pair of radial displacement sensors 29c and 29d positioned in the vicinity of the respective electromagnets 27c and 27d such that the rotor 5 is sandwiched between the radial displacement sensors 29c and 29d in the Y-axis direction. These radial displacement sensors 29a and 29d are collectively designated by reference numeral 29. Similarly, the lower radial displacement sensor unit 25 comprises two pairs of radial displacement sensors 30a, 30b, 30c, and 30d positioned in the vicinity of the lower radial magnetic bearing set 8. These radial displacement sensors 30a to 30d are collectively designated by reference numeral 30. The radial displacement sensor 29 outputs a distance signal proportional to the distance between the outer peripheral surface of the rotor 5 and the radial displacement sensor 29, and the radial displacement sensor 30 outputs a distance signal proportional to the distance between the outer peripheral surface of the rotor 5 and the radial displacement sensor 30.

The electromagnets 26, 27, and 28 and the radial displacement sensors 23, 29, and 30 are fixedly mounted on the casing 4.

The ROM 31 of the controller 2 stores processing programs used by the DSP 18. The flash memory 19 is provided with a control parameter table storing control parameters used by the magnetic bearing sets 6, 7, and 8; an identification signal table storing data (target position data) regarding identification signals, which will be described later; and a bias current table storing values of basis currents, which will be described later. The control parameter table stores tentative control parameters for identification purposes and plural sets of operation control parameters corresponding respectively to plural types of the mechanical main units 1. In the first embodiment, certain step waveform signal data Za with respect to the Z-axis direction are stored as target position data in the identification signal table. The details of the identification signal table may be rewritten using the personal computer 3.

The sensor circuit 13 activates the displacement sensors 23, 29, and 30 of the displacement detection section 9 and computes, on the basis of the signals output from the displacement sensors 23, 29, and 30, Z-axis displacement of the rotor 5 and X-axis and Y-axis displacements in the areas of the rotor 5 where the upper and lower radial displacement sensors 24 and 25 are placed. A displacement signal corresponding to the results of such computation is output to the DSP 18 through the analog-to-digital converter 20.

On the basis of a digital displacement signal which is received from the analog-to-digital converter 20 and represents displacements of the rotor 5, the DSP 18 outputs to the magnetic bearing drive circuit 14 excitation current signals corresponding to the respective electromagnets 26, 27, and 28 of the magnetic bearing sets 6, 7, and 8, through the digital-to-analog converter 21. The drive circuit 14 supplies excitation currents based on the excitation current signals output from the DSP 18 to corresponding electromagnets 26, 27, and 28 of the magnetic bearing sets 6, 7, and 8. As a result, the rotator 5 is supported at a predetermined target position in a non-contacting manner.

The DSP 18 outputs to the inverter 15 a number-of-revolution instruction signal to be delivered to the electric motor 10. On the basis of the number-of-revolutions instruction signal, the inverter 15 controls the number of revolutions of the electric motor 10. As a result, the rotator 5 is rotated at high speed by the electric motor 10 while being supported at the target position without any contact between the rotator 5 and the magnetic bearing sets 6, 7, and 8.

The controller 2 serves as an electromagnetic controller, which controls the excitation currents to be supplied to the electromagnets 26, 27, and 28 of the magnetic bearing sets 6, 7, and 8 on the basis of the signals output from the displacement sensors 23, 29, and 30.

Figure 4:
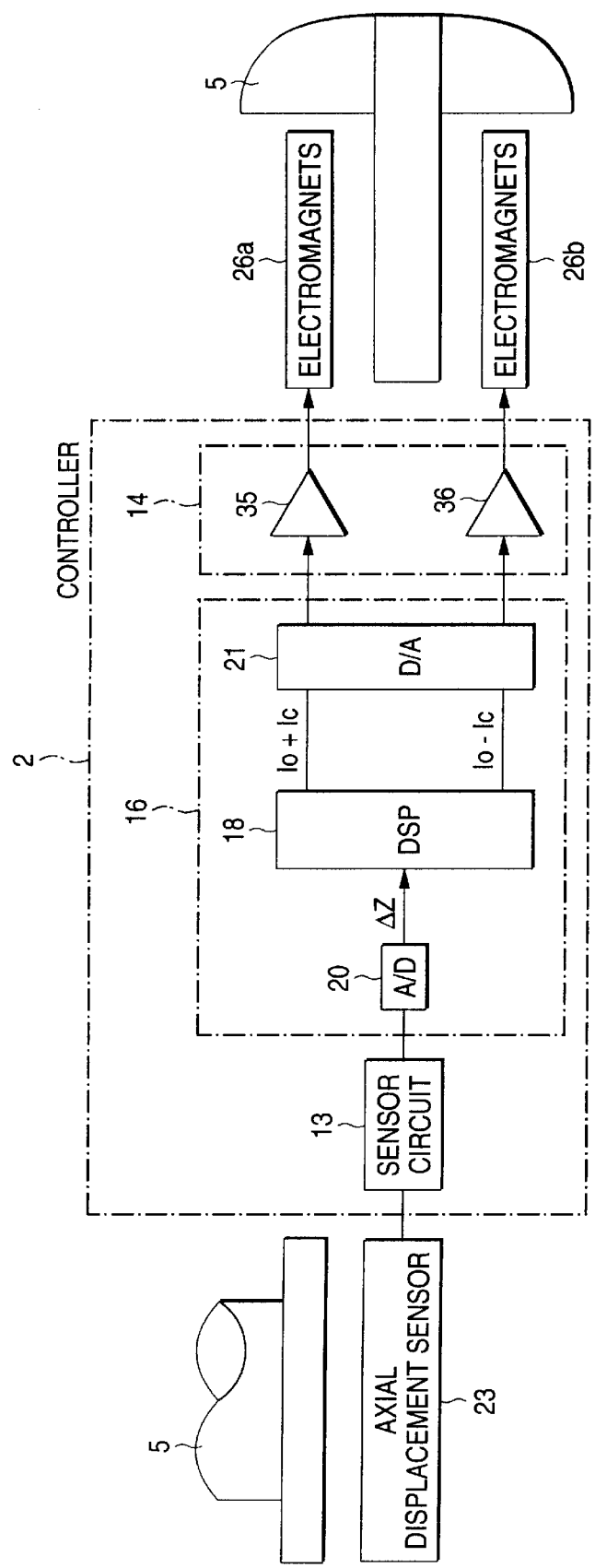
FIG. 4 is a block diagram showing a portion of the magnetic bearing relevant to a pair of axial electromagnets of the controller shown in FIG. 3.

FIG. 4 shows only the circuitry of the controller 2 that relates to control of the pair of axial electromagnets 26a and 26b in the axial magnetic bearing set 6. Control of the pair of axial electromagnets 26a and 26b by the controller 2 will now be described by reference to FIG. 4.

The Sensor circuit 13 computes Z-axis displacement of the rotator 5 with respect to the Z-axis target position (=0) from the signals output from the axial displacement sensors 23, thereby outputting a displacement signal $\Delta Z$ which is proportional to the displacement. The displacement signal $\Delta Z$ received from the sensor circuit 13 is converted into a digital value by the analog-to-digital converter 20, and the thus-converted digital displacement signal $\Delta Z$ is input to the DSP 18. As will be described later, on the basis of the digital displacement signal $\Delta Z$, the DSP 18 outputs to the digital-to-analog converter 21 a pair of excitation current signals serving as control signals which correspond to the pair of electromagnets 26. The digital-to-analog converter 21 converts a first excitation current signal (Io+Ic) into an analog signal and delivers the thus-converted signal to a first power amplifier 35 of the magnetic bearing drive circuit 14 as the first excitation current signal (Io+Ic). The first power amplifier 35 amplifies a first excitation current signal (Io+Ic) and supplies an excitation current proportional to the thus-amplified signal to the first electromagnet 26a. Similarly, the digital-to-analog converter 21 converts a second excitation current signal (Io−Ic) into an analog signal and delivers the thus-converted signal to a second power amplifier 36 of the magnetic bearing drive circuit 14 as the second excitation current signal (Io−Ic). The second power amplifier 36 amplifies a second excitation current signal (Io−Ic) and supplies an excitation current proportional to the thus-amplified signal to the second electromagnet 26b. As a result, the rotator 5 is supported in a target position in the Z-axis direction.

Figure 5:
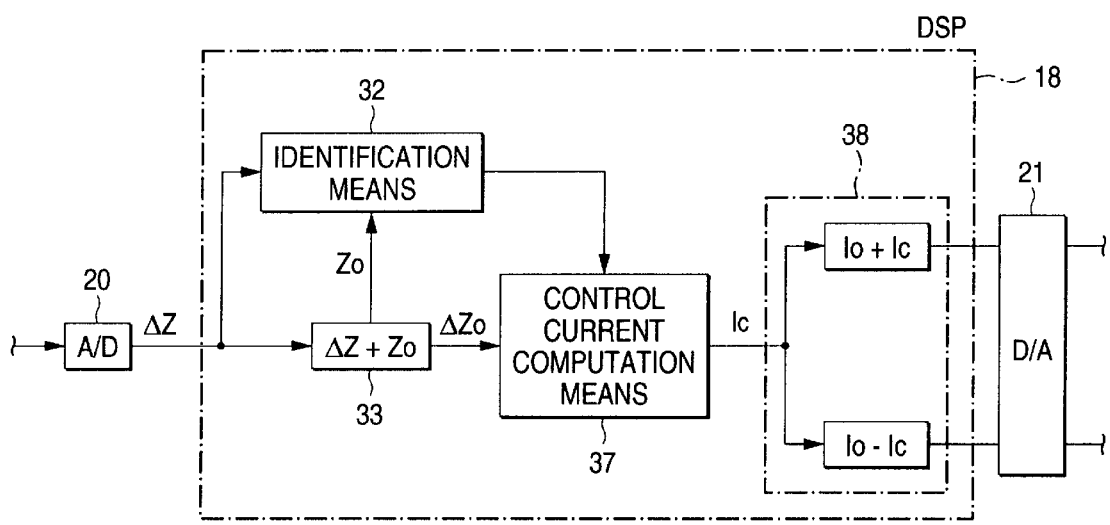
FIG. 5 is a block diagram showing an example functional configuration of a digital signal processor shown in FIG. 4.

FIG. 5 shows operations of the DSP 18 in the controller 2 shown in FIG. 4 in the form of a functional block. The DSP 18 functionally comprises identification means 32, addition means 33, control current computation means 37, and excitation current computation means 38. The identification means 32 outputs to the addition means 33 a digital target position signal Zo used for changing the target position of the rotator 5. The addition means 33 outputs to the control current computation means 37 a signal $\Delta Zo$ (a target-position-added displacement signal) formed by addition of the target position signal Zo received from the identification means 32 to the displacement signal $\Delta Z$ received from the analog-to-digital converter 20. Except for the case other than the case where the type of the mechanical main unit 1 is identified, which will be described later, the target position signal Zo is 0. The target-position-added displacement signal ΔZo is equal to the target position signal ΔZ. From the displacement signal ΔZo, the control current computation means 37 computes a control current value Ic to be supplied to the electromagnets 26a and 26b through, e.g., PID computation. The excitation current computation means 38 adds a bias current value I0 stored in a table 34 of the flash memory 19 to the control current value Ic thus computed, thereby obtaining a value (I0+Ic). This value (I0+Ic) is output to the digital-to-analog converter 21 as a first excitation current value. The control current value Ic is subtracted from the bias current value I0, thereby obtaining a value (I0–Ic). This value (I0–Ic) is output to the digital-to-analog converter 21 as a second excitation current value.

Figure 6:
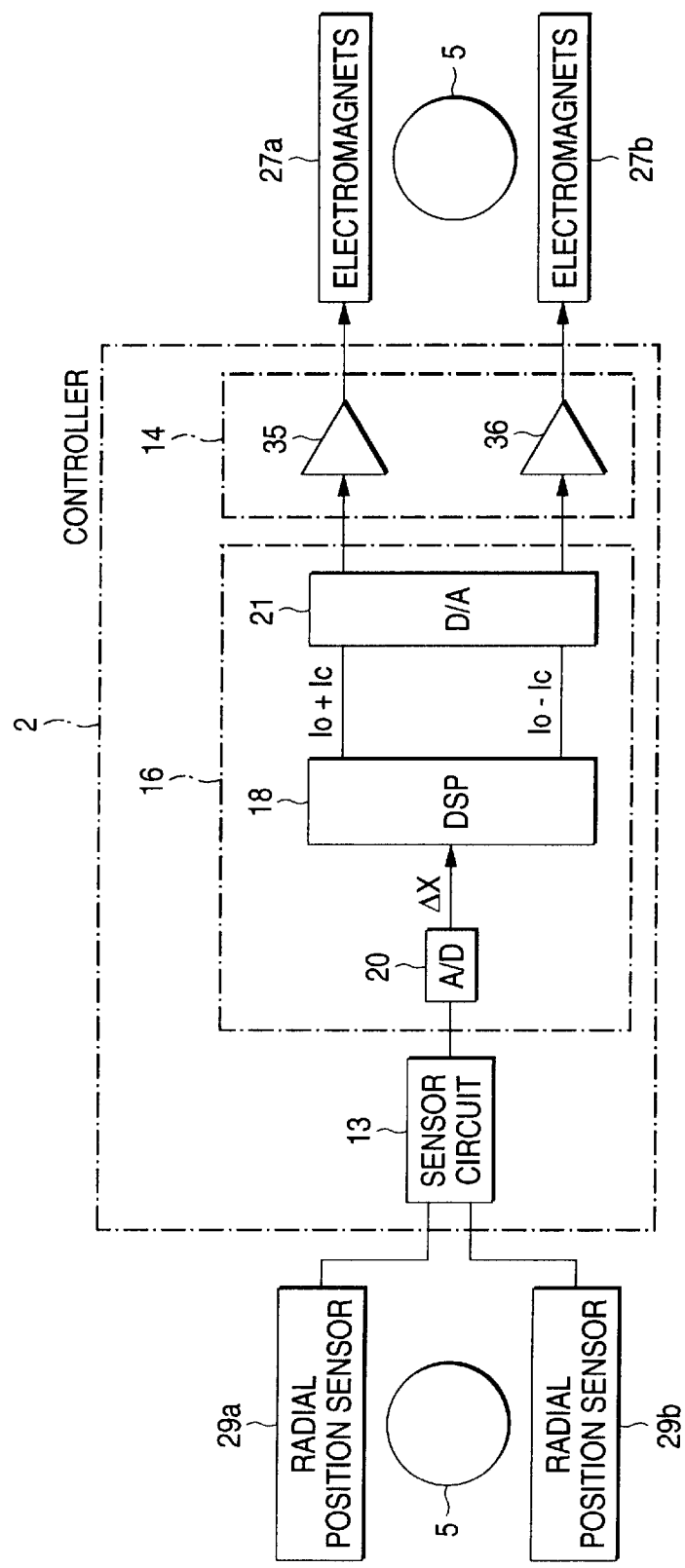
FIG. 6 is a block diagram showing a portion of the magnetic bearing relevant to a pair of radial electromagnets of the controller shown in FIG. 3.

FIG. 6 shows only the circuitry of the controller 2 that is relevant to control of the pair of radial electromagnets 27a and 27b oriented in the X-axis direction within the upper radial magnetic bearing set 7. The sensor circuit 13 determines the arithmetical difference between respective signals output from the pair of radial position sensors 29a and 29b oriented in the X-axis direction within the upper radial position sensor unit 24, thereby calculating X-axis displacements relative to the target position (=0) in the area of the rotator 5 where the upper radial magnetic bearing set 7 is positioned. The sensor circuit 13 outputs a displacement signal ΔX proportional to the thus-calculated displacement. The displacement signal ΔX output from the sensor 13 is converted into a digital value (a digital displacement signal) by means of the analog-to-digital converter 20, and the resultant digital displacement signal ΔX is input to the DSP 18. The input of the digital displacement signal ΔX to the DSP 18 is followed by processing steps identical to those performed by the circuit shown in FIG. 4. Corresponding elements are assigned the same reference numerals. In this case, the DSP 18 may be equipped with the identification means 32 and the addition means 33 shown in FIG. 5, and the digital displacement signal ΔX received from the analog-to-digital converter 20 may be input to the control current computation means 31, exactly as is.

The foregoing explanation is also applied to control of the pair of radial electromagnets 27c and 27d oriented in the Y-axis direction within the upper radial magnetic bearing set 7, control of the pair of radial electromagnets 28a and 28b oriented in the X-axis direction within the lower radial magnetic bearing set 8, and control of the pair of radial electromagnets 28c and 28d oriented in the Y-axis direction within the lower radial magnetic bearing 8.

In the magnetic bearing, when power to the controller 2 is not turned on, the magnetic bearing sets 6, 7, 8 and the electric motor 10 remain inactive, and the rotator 5 is mechanically supported in a stationary state by means of the protective bearing sets 11 and 12. At this time, the rotator 5 is stationary at the lowermost limit position of the movable range of the rotator 5 in the Z-axis direction under the influence of gravity.

When power to the controller 2 is turned on, the identification means 32 of the DSP 18 identifies the mechanical main unit 1 in the following manner.

When power to the controller 2 is turned on, there is effected control of the excitation current supplied to the electromagnet 26 of the magnetic bearing set 6, that supplied to the electromagnet 27 of the magnetic bearing set 7, and that supplied to the electromagnet 28 of the magnetic bearing set 8, through use of tentative control parameters for identification purpose, so that the rotator 5 is supported in a predetermined target position in a non-contacting manner.

Subsequently, the target position of the rotator 5 in the Z-axis direction is changed stepwise. On the basis of the reactions to the stepwise changes made by the rotator 5 in the Z-axis direction, the type of the mechanical main unit 1 is identified. Control parameters for operation purpose corresponding to the result of such identification are selected, and the magnetic bearing sets 6, 7, and 8 are controlled through use of the thus-selected control parameters. The state in which the rotator 5 is not supported by the magnetic bearing sets 6, 7, and 8 in a non-contacting manner will be hereinafter referred to as a "contact supported state." In contrast, the state in which the rotator 5 is supported in a target position by the magnetic bearings 6, 7, and 8 in a non-contacting manner is referred to as a "magnetic flowing state."

Figure 7:
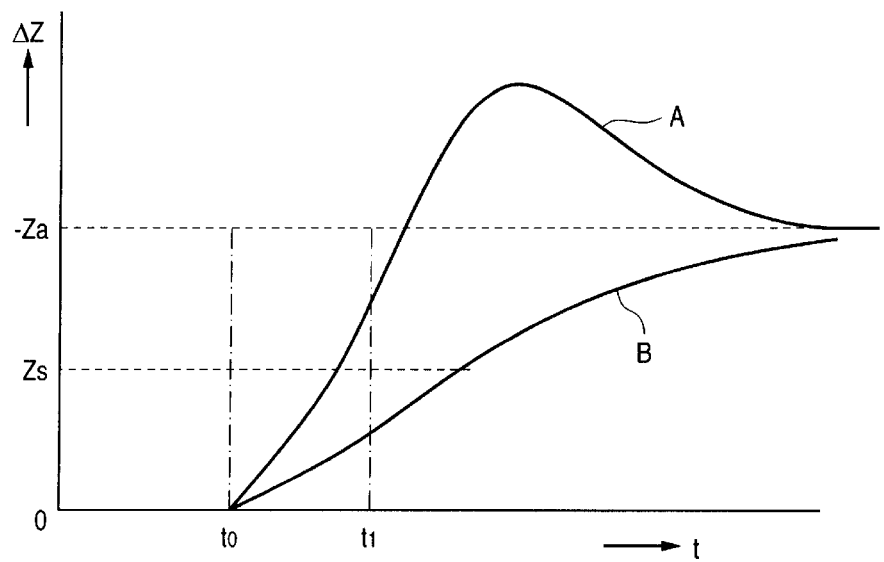
FIG. 7 is a graph showing an example of transient response by the rotator when the type of the mechanical main unit is identified.

The operations performed by the DSP 18 in order to control the axial magnetic bearing set 6 during the identification of type of the mechanical main unit 1 will be described further in detail by reference to FIGS. 4, 5, and 7. FIG. 7 shows transient response of the rotator 5 in the direction of the control axis; namely, Z-axis displacement of the rotator 5 caused by stepwise changes in the Z-axis target position or chronological changes in the digital displacement signal ΔZ. In the graph, the horizontal axis represents time (t), and the vertical axis represents the digital displacement signal ΔZ.

When power to the controller 2 is turned on, the identification means 32 sets the target position signal Zo to 0, reads from the flash memory 19 tentative control parameters for identification purpose, and sets the thus-read control parameters in a predetermined location of the flash memory 19. After completion of setting of the target position signal Zo and the control parameters, the addition means 33 adds the digital displacement signal ΔZ to the target position signal Zo, thereby calculating a target-position-added displacement signal ΔZo. Since the target position signal Zo is set to 0, the target-position-added displacement signal ΔZo is equal to the digital displacement signal ΔZ. From this target-position-added displacement signal ΔZo, the control current computation means 37 calculates the control current Ic in the manner as mentioned previously. Calculation of the control current is followed by processing operations identical with those mentioned previously. Through use of the tentative control parameters, the rotator 5 is supported in a target position, where the Z-axis displacement becomes 0, in a non-contacting manner.

If the rotator 5 is supported in a non-contracting manner, the identification means 32 reads the step waveform signal data Za stored in the identification signal table of the flash memory 19 and superimposes the thus-read data on the target position signal Zo. As a result, the target-position-added displacement signal ΔZo calculated by the addition means 33 corresponds to a signal resulting from addition of a given step input (i.e., the step waveform signal data Za) to the displacement signal ΔZ. This target-position-added displacement signal ΔZo is input to the control current computation means 37. As a result, the target position of the rotator 5 in the Z-axis direction is changed stepwise from displacement position 0 to displacement position –Za. The rotator 5 is supported in the target position, where the Z-axis displacement becomes –Za, in a non-contracting manner. After having superimposed the step waveform signal data Za on the target position signal Zo, the identification means 32 examines the transient response of the rotator 5 in the Z-axis direction by examination of the displacement signal ΔZ. On the basis of results of such examination, the identification means 32 identifies the type of the mechanical main unit 1.

When the Z-axis target position of the rotator 5 is changed stepwise, the rotator 5 makes transient responses in the Z-axis direction, such as those shown in FIG. 7. The transient responses vary according to the type of the mechanical main unit 1. In FIG. 7, reference symbol A represents a transient response of the mechanical main unit 1 of type A, and reference symbol B represents a transient response of the mechanical main unit 1 of type B. In such a case, for example, after the target position of the rotator 5 has been changed stepwise at time point "t0," the Z-axis displacement of the rotator 5 at time point t1 is calculated. Through comparison between the thus-calculated Z-axis displacement and the predetermined threshold value Zs, the identification means 32 can identify whether the type of the mechanical main unit 1 is type A or type B.

After having completed identification of type of the mechanical main unit 1, the identification means 32 reads from the table of the flash memory 19 control parameters corresponding to the type of the mechanical main unit 1 determined by identification. The thus-read control parameters are set in a predetermined location of the flash memory, and the target position signal Zo is again set to 0. As a result, the rotator 5 is supported in a target position, where displacement becomes 0, in a non-contacting manner through use of the control parameters corresponding to the type of the mechanical main unit 1. If the rotator 5 is supported in a non-contracting manner in the manner as mentioned above, the electric motor 10 is driven, thereby rotating the rotator 5 at high speed.

The target position of the rotator 5 can be changed by setting the target position signal Zo to an appropriate value other than 0 by means of the identification means 32 during operation, as required.

FIG. 7 shows the transient responses of two types of mechanical main units 1. Even in the case of there are three or more types of mechanical main units 1, they may be identified in the analogous manner.

Although the type of the mechanical main unit 1 is identified by addition of a stepwise signal to the displacement signal ΔZ and by examination of transient responses by the rotator 5, the type of the mechanical main unit 1 may be identified by examination of the response of the rotator 5 when a sinusoidal signal of predetermined frequency or a sinusoidal signal of variable frequency is superimposed on the displacement signal ΔZ.

In a case where a sinusoidal signal of predetermined frequency is superimposed on the displacement signal ΔZ, the data regarding a sinusoidal signal are stored in the identification signal table of the flash memory 19 of the controller 2. At the time of identification of the mechanical main unit 1, the identification means 32 reads the data at given intervals and outputs the thus-read data to the addition means 33.

In a case where a sinusoidal signal of variable frequency is superimposed on the displacement signal ΔZ, at the time of identification of the mechanical mein unit 1 the identification means 32 reads the date regarding a sinusoidal signal stored in the identification signal table of the flash memory 19 of the controller 2 at intervals corresponding to a required frequency and outputs the thus-read data to the addition means 33.

Second Embodiment

In the second embodiment, the data regarding a sinusoidal signal of given frequency are stored in the identification signal table as excitation data. The details of the table can be rewritten by use of the personal computer 3.

Figure 8:
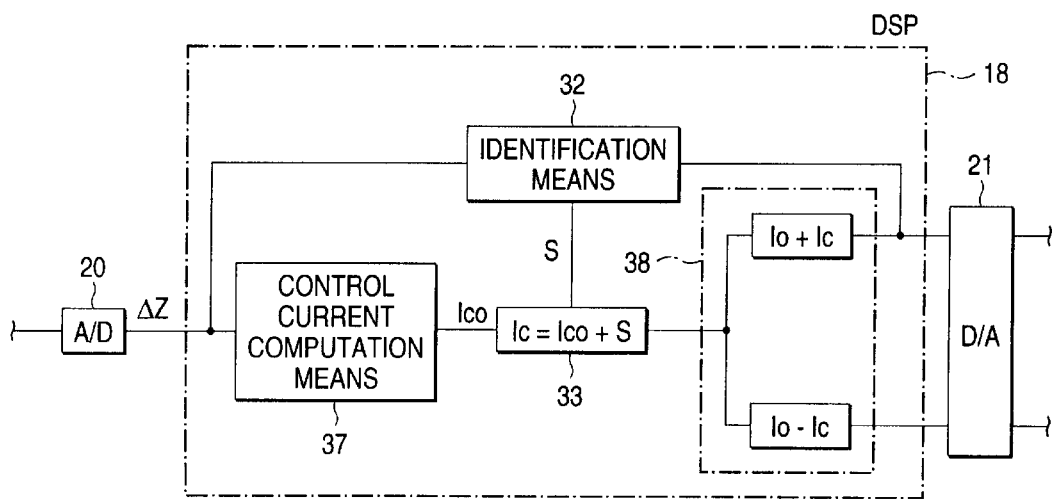
FIG. 8 is a block diagram showing another example functional configuration of the digital signal processor shown in FIG. 4.

FIG. 8 represents the operation of the DSP 18 of the controller 2 shown in FIG. 4 in the form of a functional block diagram. The DSP 18 functionally comprises the control current computation means 37, the identification means 32, the addition means 33, and the excitation current computation means 38. From the displacement signal ΔZ received from the analog-to-digital converter 20, the control current computation means 37 computes the control current value Ico fed to the electromagnets 26a and 26b through, e.g., PID computation. The identification means 32 outputs to the addition means 33 a digital excitation signal S for exciting the rotator 5. The addition means 33 adds the excitation signal S received from the identification means 32 to the control current value Ico received from the control current computation means 37, thereby generating a new control current Ic. The thus-generated control current Ic is output to the excitation current computation means 38. The excitation signal S is usually 0, except while the type of the mechanical main unit 1 is being identified, as will be described later. The control current value Ic output from the addition means 33 is equal to the control current value Ico output from the control current computation means 37. The excitation current computation means 38 adds the control current value Ic received from the addition means 33 to the bias current value Ic stored in the table 34 of the flash memory 19, outputs the resultant value (Io+Ic) to the digital-to-analog converter 21 as a first excitation current value, subtracts the control current value Ic from the bias current value Io, and outputs the resultant value (Io−Ic) to the digital-to-analog converter 21 as a second excitation current. Alternatively, the control current value Ico received from the control current computation means 37 may be input to the excitation current computation means 38, exactly as is, without need to provide the identification means 32 and the addition means 33 shown in FIG. 8 to the DSP 18 shown in FIG. 6.

Figure 9:
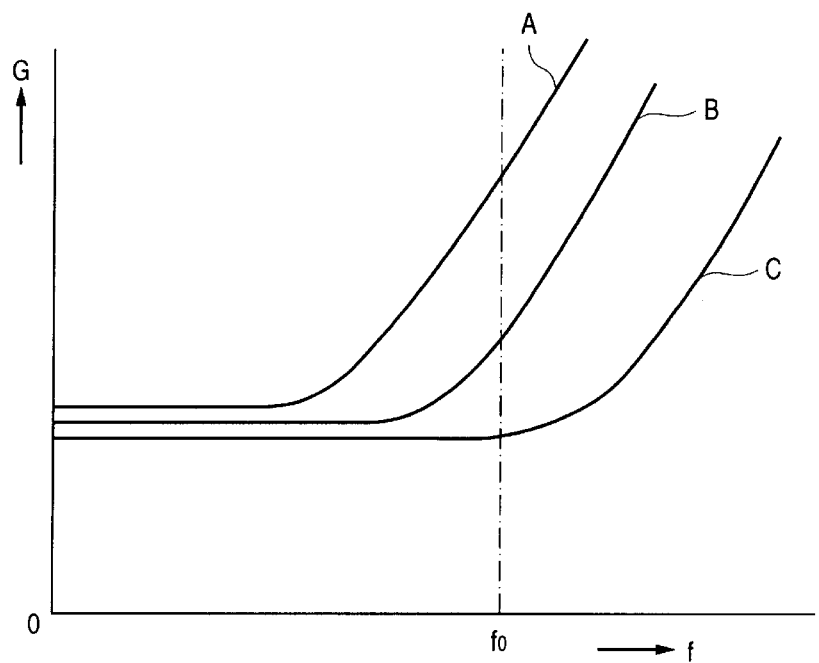
FIG. 9 is a graph showing an example of gain characteristics of the rotator when the type of the mechanical main unit is identified.

The operations of the DSP 18 required for controlling the axial magnetic bearing set 6 at the time of identification of type of the mechanical main unit 1 will be described further in detail by reference to FIGS. 4, 8, and 9. FIG. 9 shows frequency responses by the rotator 5 in the direction of the control axis; namely, the gain characteristics of the rotator 5 in the Z-axis direction when the rotator 5 is excited in the Z-axis direction. In the drawing, the horizontal axis represents a frequency "f," and the vertical axis represents a gain G.

When power to the controller 2 is turned on, the identification means 32 sets the excitation signal S to 0, reads tentative control parameters for identification purpose from the flash memory 19, and sets the thus-read control parameters in a predetermined location of the flash memory 19. After completion of setting of the excitation signal S and the control parameters, the control current computation means 37 computes the control current Ico from the displacement signal ΔZ in the manner as mentioned previously, through use of the tentative control parameters. The addition means 33 adds the excitation signal S to the control current Ico received from the control current computation means 37, thus calculating a new control current value Ic. At this time, since the excitation signal has been set to 0, the control current value Ic is equal to the control current value Ico. As will be described later, the rotator 5 is supported in a predetermined target position in the Z-axis direction, through use of the control parameters.

If the rotator 5 is supported in a non-contacting manner, the identification means 32 reads at given intervals the data regarding a sinusoidal signal stored in the identification signal table of the flash memory 19 and outputs the thus-read data to the addition means 33 as the excitation signal S. As a result, the control current value Ic computed by the addition means 3 corresponds to a signal resulting from a sinusoidal signal of given frequency being added to the control current value Ico received from the control current computation means 37. The excitation current supplied to one pair of electromagnets 26a and 26b corresponds to a signal resulting from a sinusoidal signal being added to the excitation current supplied at the time of normal control operations. The rotator 5 is excited in the Z-axis direction by means of the sinusoidal signal. During the period in which the data regarding the sinusoidal signal are output as the excitation signal S, the identification means 32 examines the gain characteristics of the rotator 5 by means of the displacement signal ΔZ received from the DSP 18 and the first excitation current value (Io+Ic) that is received from the excitation current computation means 38 and is one of the signals received from the DSP 18. On the basis of the result of such examination, the identification means 32 identifies the type of the mechanical main unit 1.

The gain characteristics of the rotator 5 in the Z-axis direction obtained when the rotator 5 is excited in the Z-axis direction are as shown in FIG. 9, and the gain characteristic changes according to the type of the mechanical main unit 1. In FIG. 9, reference symbol A represents a gain characteristic of the rotator 5 in the case of the mechanical main unit 1 of type A; reference symbol B represents a gain characteristic of the rotator 5 in the case of the mechanical main unit 1 of type B; and reference symbol C represents a gain characteristic of the rotator 5 in the case of the mechanical main unit 1 of type C. In such as case, the mechanical main unit 1 may be identified as corresponding to one of the types A, B, and C by calculation of the gain of the rotator 5 in the Z-axis direction when the rotator 5 is excited by an excitation current of a given frequency "fo."

After completion of identification of the mechanical main unit 1, the identification means 32 reads from the table of the flash memory 19 control parameters corresponding to the type of the mechanical main unit 1 determined by identification, and the thus-read control parameters are set in a predetermined location of the flash memory. Simultaneously, the excitation signal S is reset to 0, whereby the rotator 5 is supported in a predetermined target position in a non-contacting manner through use of the control parameters corresponding to the type of the mechanical main unit 1. After the rotator 5 has been supported in such a non-contacting manner as mentioned previously, the electric motor 10 is activated, thereby rotating the rotator 5 at high speed.

FIG. 9 shows the gain characteristics of the rotator 5 obtained for mechanical main units 1 of three different types. Even in a case where more than two, or more than four, types of mechanical main units 1 are available, the type of the mechanical main unit 1 may be identified in a manner similar to that mentioned previously.

In the second embodiment, the rotator 5 is excited by addition of a sinusoidal signal to the control current value Ico received from the control current computation means 37. However, the rotator 5 may also be exited by superimposition of a sinusoidal signal on each of the two excitation current values (Io+Ic) and (Io−Ic) received from the excitation current computation means 38.

Although the second embodiment has described an example in which the type of the mechanical main unit 1 is identified by superimposition of a sinusoidal signal if predetermined frequency on the control current value Ico so as to excite the rotator 5, the type of the mechanical main unit 1 may be identified by superimposition of a sinusoidal signal of variable frequency to the control current value Ico so as to excite the rotator 5 and by examination of the response of the rotator 5.

In a case where the sinusoidal signal of variable frequency is superimposed on the control current value Ico, for example, the identification means 32 is arranged, at the time of identification of the mechanical main unit 1, so as to read the data regarding a sinusoidal signal stored in the identification signal table of the flash memory 19 of the controller 12 at intervals corresponding to a required frequency and to output the thus-read data to the addition means 33.

In the second embodiment, the DSP 18 excites the rotator 5 by way of the identification means 32 and the addition means 33 and through use of the excitation data stored in the identification signal table. Alternatively, the rotator 5 may be excited while a mechanical exciting device is used as excitation means.

Third Embodiment

Figure 10:
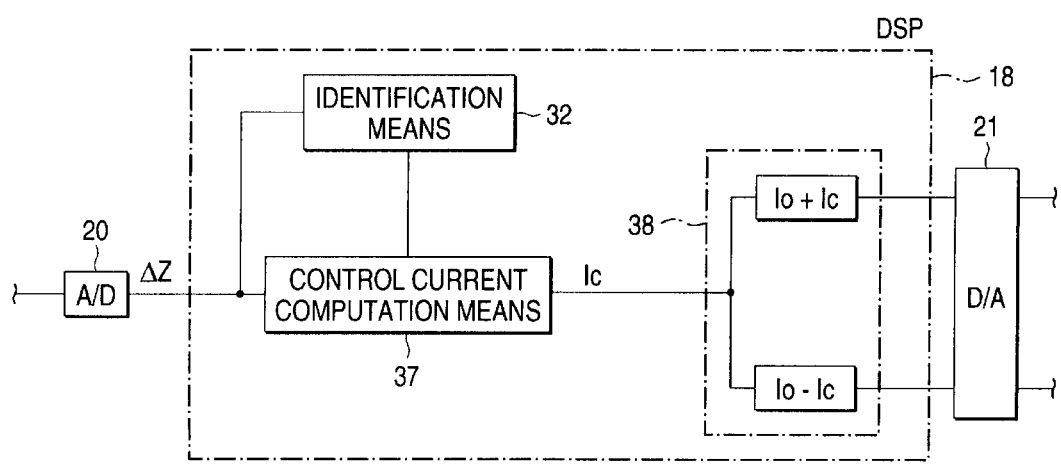
FIG. 10 is a block diagram showing still another example functional configuration of the digital signal processor shown in FIG. 4.

FIG. 10 shows the operation of the DSP 18 of the controller 2 shown in FIG. 2 in the form of a functional block diagram. The DSP 18 functionally comprises the identification means 32, the control current computation means 37, and the excitation current computation means 38. From the displacement signal ΔZ received from the analog-to-digital converter 20, the control current computation means 37 computes the control current value Ic fed to the electromagnets 26a and 26b through, e.g., PID computation. The excitation current computation means 38 adds the control current value Ic received from the control current computation means 37 to the bias current value Io stored in the table 34 of the flash memory 19, outputs the resultant value (Io+Ic) to the digital-to-analog converter 21 as a first excitation current value, subtracts the control current value Ic from the bias current value Io, and outputs the resultant value (Io−Ic) to the digital-to-analog converter 21 as a second excitation current. The identification means 32 identifies the type of the mechanical main unit 1, as will be described later.

Figure 11:
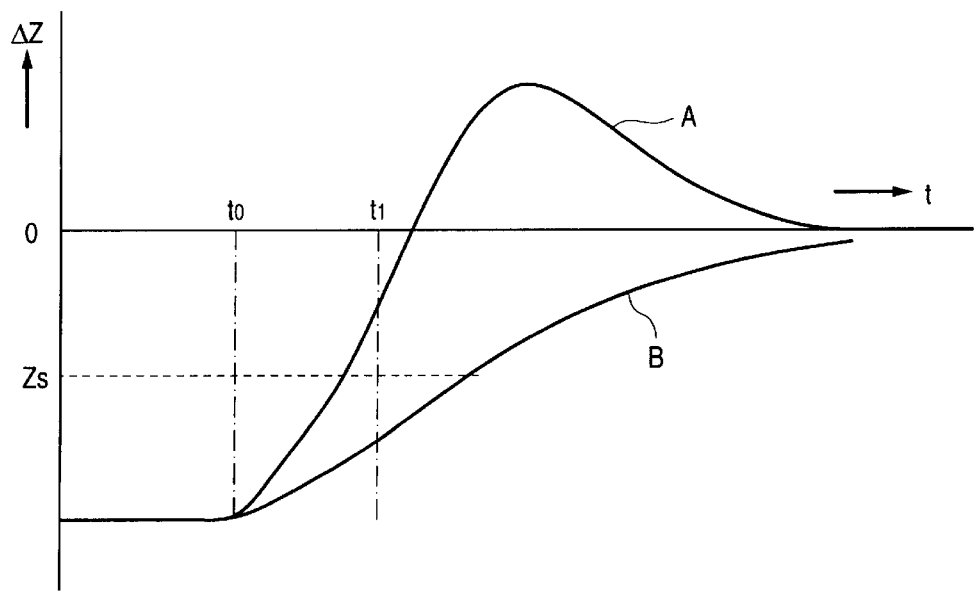
FIG. 11 is a graph showing an example of response by the rotator when the rotator is magnetically levitated.

The operations of the DSP 18 required for controlling the axial magnetic bearing set 6 at the time of identification of type of the mechanical main unit 1 will be described further in detail by reference to FIGS. 4, 10, and 11. FIG. 11 shows responses of the rotator 5 when the rotator 5 is magnetically levitated; namely, displacement of the rotator 5 in the Z-axis direction or chronological variations in the digital displacement signal ΔZ. In the graph, the horizontal axis represents time "t," and the vertical axis represents the displacement signal ΔZ.

When power to the controller 2 is turned on, the identification means 32 reads tentative control parameters for identification purpose from the flash memory 19, and sets the thus-read control parameters in a predetermined location of the flash memory 19. After completion of setting of the control parameters, the control current computation means 37 computes the control current Ic from the displacement signal ΔZ in the manner as mentioned previously, through use of the tentative control parameters. Computation of the control current Ic is followed by processing operations identical with those mentioned previously, whereby the rotator 5 is supported in a predetermined target position in the Z-axis direction, through use of the control parameters.

While the rotator 5 is magnetically levitated, the identification means 32 examines the displacement signal ΔZ, thereby examining the response to magnetic levitation by the rotator 5 in the Z-axis direction and identifying the type of the mechanical main unit 1 on the basis of the result of such examination.

Magnetic levitation of the rotator 5 corresponds to stepwise changes in the target position of the rotator 5 in the Z-axis direction. Consequently, the response to magnetic levitation by the rotator 5 in the Z-axis direction becomes equal to one of the transient responses by the rotator 5 when the target position of the rotator 5 in the Z-axis direction is changed stepwise, such as those shown in FIG. 11. The transient response by the rotator 5 varies according to the type of the mechanical main unit 1. In FIG. 11, reference symbol A represents a transient response in the case of the mechanical main unit 1 of type A; and reference symbol B represents a transient response in the case of the mechanical main unit 1 of type B. In such a case, for example, after magnetic levitation of the rotator 5 has been commenced at time "to," displacement of the rotator 5 in the Z-axis direction is calculated at time t1. The thus-calculated displacement is compared with a predetermined threshold value Zs, thus enabling identification as to whether the mechanical main unit 1 is of type A or type B.

FIG. 11 shows two responses by the rotator 5, representing the case where two types of mechanical main units 1 are available. The present invention can be similarly applied to a case where more than three types of mechanical main units 1 are available.

In the third embodiment, the type of the mechanical main unit 1 is identified on the basis of the response by the rotator 5 in a situation in which the rotator 5 in the complete contact supported state (in which the rotator 5 is not supported by the magnetic bearing sets 6, 7, and 8 at all) is magnetically levitated. However, the type of the mechanical main unit 1 may also be identified on the basis of the response by the rotator 5 in a situation in which the rotator 5 in an incomplete contact supported state (in which the rotator 5 is supported by one of the magnetic bearing sets 6, 7, and 8) is magnetically levitated. More specifically, the type of the mechanical main unit 1 may be identified on the basis of the response by the rotator 5 in a situation in which the rotator 5 in an incomplete contact supported state (in which the rotator 5 is supported in the target position only in either the X-axis or Y-axis direction by means of only the radical magnetic bearing sets 7 and 8) is magnetically levitated and supported also in the target position in the Z-axis direction by means of the axial magnetic bearing set 6. Further, the type of the mechanical main unit 1 may be identified on the basis of the response by the rotator 5 in a situation in which, after the rotator 5 has been completely magnetically levitated and supported in the target position in all the three directions of the control axes by means of all the magnetic bearing sets 6, 7, and 8, the rotator 5 is moved to the lowermost limiting position in the Z-axis direction by deactivation of the axial bearing set 6, and then the rotator 5 is again magnetically levitated and supported in the target position by means of the axial magnetic bearing set 6. Furthermore, the type of the mechanical main unit 1 may be identified on the basis of the response by the rotator 5 in a situation in which the rotator 5 in an incomplete contacting supported state (in which the rotator 5 is supported only in the Y-axis and Z-axis directions by means of only the electromagnet 26 of the axial magnetic bearing set 6, the electromagnets 27*c* and 27*d* of the radial magnetic bearing set 7 in the Y-axis direction, and the electromagnets 28*c* and 28*d* of the radial magnetic bearing set 8 in the Y-axis direction and is supported in the X-axis direction in one of the limiting positions by means of the protective bearing sets 11 and 12) is magnetically levitated and supported in the target position also in the X-axis direction by means of the electromagnets 27*a* and 27*b* of the radial axis bearing set 7 in the X-axis direction and the electromagnets 28*a* and 28*b* of the radial axis bearing set 8 in the X-axis direction. In these cases, the X-axis and the Y-axis may be reversed in position.

Fourth Embodiment

Figure 12:
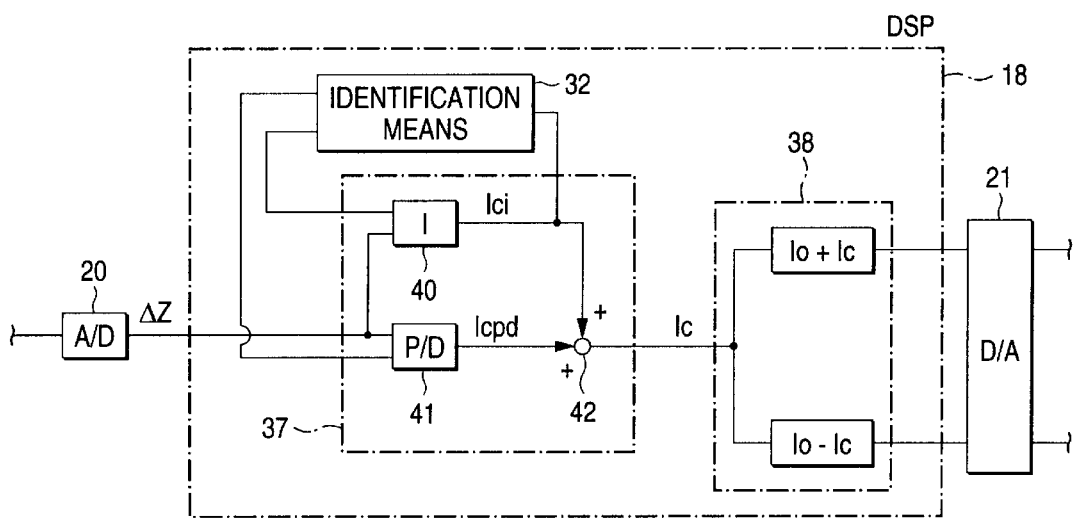
FIG. 12 is a block diagram showing yet another example functional configuration of the digital signal processor shown in FIG. 4.

FIG. 12 shows the operation of the DSP 18 of the controller 2 shown in FIG. 4 in the form of a functional block diagram. The DSP 18 functionally comprises the identification means 32, the control current computation means 37, and the excitation current computation means 38. The control current computation means 37 computes the control current Ic supplied to the electromagnets 26*a* and 26*b*, from the displacement signal ΔZ received from the analog-to-digital converter 20 through PID computation and comprises an integration section 40, a proportional-and-differentiation section 41, and an addition section 42. The integration section 40 computes a differential component Ici of the control current value IC from the displacement signal ΔZ through use of an integration control parameter set. The proportional-and-differentiation section 41 computes a proportional-and-differential component Icpd of the control current value Ic from the displacement signal ΔZ through use of a proportional computation control parameter and a differentiation control parameter. The addition section 42 computes the control current value Ic by addition of the integral component Ici to the proportional-and-differential component Icpd and outputs the thus-computed control current value Ic to the excitation current computation means 38. Alternatively, the proportional-and-differentiation section 41 may be divided into a proportional computation section and a differentiation section. The control current value Ic may by calculated by addition of a proportional component output from the proportional computation section, a differential component output from the differentiation section, and the integral component Ici output from the integration section 40. The excitation current computation means 38 adds the control current value Ic received from the control current computation means 37 to the bias current value Io stored in the table 34 of the flash memory 19. The excitation current means 38 outputs a resultant value (Io+Ic) to the digital-to-analog converter 21 as a first excitation current value, substracts the control current Ic from the bias current value Io, and outputs a resultant value (Io−Ic) to the digital-to-analog converter 21 as a second excitation current value. The identification means 32 identifies the type of the mechanical main unit 1, as will be described later.

Alternatively, the DSP 18 shown in FIG. 6 may be provided with the identification means 32 shown in FIG. 12.

When power to the controller 2 is turned on, the DSP 18 controls the excitation currents supplied to the electromagnets 26, 27, and 28 of the respective magnetic bearing sets 6, 7, and 8 through use of tentative control parameter sets for identification purpose, whereby the rotator 5 is supported in a predetermined target position in a non-contacting manner. On the basis of the integral component Ici of the control current value Ic obtained at this time, the type of the mechanical main unit 1 is identified. A control parameter set for operation purpose corresponding to the result of such identification is selected, and from then on the magnetic bearing sets 6, 7, and 8 are controlled through use of the thus-selected control parameter set.

Figure 13:
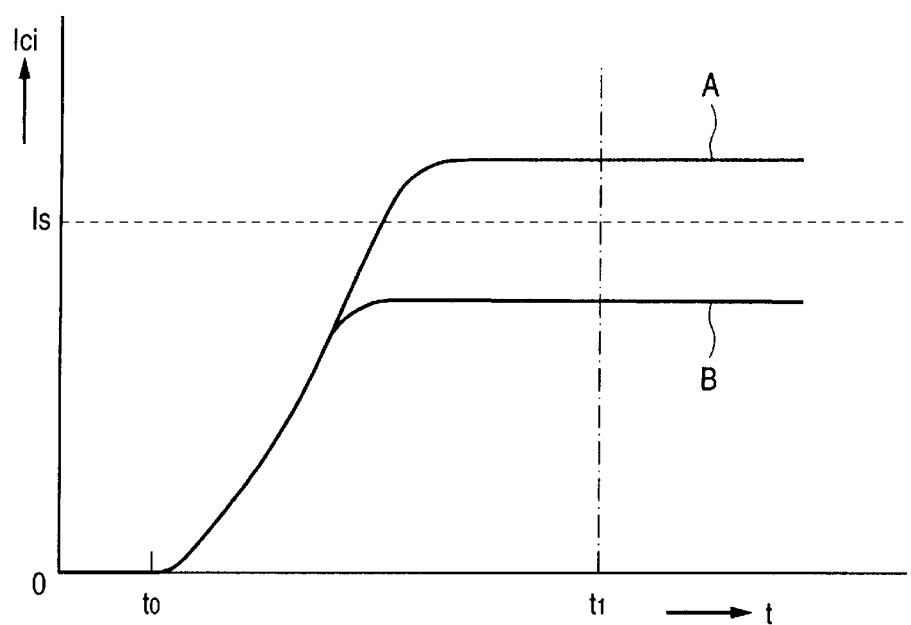
FIG. 13 is a graph showing an example of chronological variations in an integral component of a control current value when the rotator is magnetically levitated.

The operation of the DSP 18 required for controlling the axial magnetic bearing set 6 upon identification of type of the mechanical main unit 1 will be described in detail by reference to FIGS. 4, 12, and 13. FIG. 13 shows chronological variations in the integral component Ici of the control current value Ic upon magnetic levitation of the rotator 5. In the graph, the horizontal axis represents time "t," and the vertical axis represent an integral component Ici.

When power to the controller 2 is turned on, the identification means 32 reads a tentative control parameter set from the flash memory 19 and sets the thus-read control parameter set in a predetermined location of the flash memory 19. After completion of setting of the control parameter set, the integration section 40 of the control current computation means 37 computes the integral component Ici of the control current value Ic from the displacement signal ΔZ through use of the tentative integration control parameter. The proportional-and-differentiation section 41 computes the proportional-and-differential component Icpd of the control current value Ic from the displacement signal ΔZ through use of the tentative proportional computation control parameter and the differentiation control parameter. The addition section 42 computes the control current value Ic from the proportional-and-differential component Icpd. The computation of the control current value Ic is followed by the processing operations identical with those described previously. As a result, the rotator 5 is supported in a predetermined target position in the Z-axis direction in a non-contacting manner through use of the tentative control parameter set.

When the rotator 5 is magnetically levitated, the identification means 32 checks the integral component Ici of the control current Ic output from the integration section 40 and identifies the type of the mechanical main unit 1 on the basis of the result of such a check.

The integral component Ici of the control current value Ic obtained when the rotator 5 is magnetically levitated is as shown in FIG. 13 and reaches a predetermined steady state value at a certain point in time after magnetic levitation of the rotator 5 has been commenced. The integral component Ici at a steady state changes according to the type of the mechanical main unit 1. In FIG. 13, reference symbol A represents the integral component of the control current vale in the case of the mechanical main unit 1 of type A, and reference symbol B represents the integral component of the control current value in the case of the mechanical main unit 1 of type B. In such a case, for example, after magnetic levitation of the rotator 5 has been commenced at time "to," the integral component Ici at a steady state is calculated at a suitable time t1. The thus-calculated integral component Ici is compared with a predetermined threshold value Is, thus enabling identification as to whether the mechanical main unit 1 is of type A or type B.

FIG. 13 shows two integral components in a case where two types of mechanical main units 1 are available. However, even in a case where three or more types of mechanical main units 1 are available, they may be identified in an analogous manner.

The present invention is not limited to the first through fourth embodiments that have been described above.

In the previous embodiments, the DSP 18 computes the excitation current value. In another configuration, the DSP 18 may compute a control current value and outputs the control current value as a control signal, and a hardware circuit may compute an excitation current.

In the previous embodiments, identification of type of the mechanical main unit 1 and selection of a control parameter set are carried out automatically. In another configuration, only the type of the mechanical main unit 1 may be automatically identified, and selection and setting of a control parameter set may be carried out manually. In such a case, for example, the result of identification of the mechanical main unit 1 may be indicated on a display of the personal computer 3. A control parameter set corresponding to the result of such identification is manually selected or set by use of a computer. In still another configuration, only the type of the mechanical main unit 1 may be identified, and a control parameter set may not be selected or set. In such a case, the controller 2 may be arranged so as to use only one of the control parameter sets and identifies the type of the mechanical main unit 1 through use of the thus-selected control parameter set. A check is made as to whether or not the control parameter set used with the controller 2 is optimum for the type of the mechanical main unit 1. If the control parameter set is optimum for use with the mechanical main unit 1, alarm is activated. In contrast, if the control parameter is not optimum for use with the mechanical main unit 1, operations are commenced, without modification.

When the Z axis extends in the vertical direction in the manner as mentioned previously, the type of the mechanical main unit 1 should preferably be identified on the basis of the response by the rotator 5 in the vertical Z-axis direction and the integral component of the limitation current value in the Z-axis direction. Alternatively, the type of the mechanical main unit 1 may also be identified on the basis of the response by the rotator 5 in the X-axis direction or the response by the rotator 5 in the Y-axis direction. Alternatively, the type of the mechanical main unit 1 may be identified on the basis of the response by the rotator 5 in any two directions of the three control axis, i.e., the X, Y, and Z axes. Alternatively, the type of the mechanical main unit 1 may be identified on the basis of the response by the rotator 5 in the directions of the three control axes.

The magnetic bearing comprises a vertical magnetic bearing supporting the rotator 5 in a vertical position, such as that mentioned previously, and a horizontal magnetic bearing horizontally supporting the rotator 5. The present can also be applied to the horizontal magnetic barging. The response by the rotator, etc., may change according to whether the magnetic bearing is of vertical or horizontal type. In any of these types, the response by the rotator, etc., may change according to the type of the mechanical main unit. Since the type of the magnetic bearing; that is, a horizontal magnetic bearing or a vertical magnetic bearing, has been usually ascertained beforehand, a controller corresponding to the type of the magnetic bearing may be used. Alternatively, a set of control parameters for use with a vertical magnetic bearing (i.e., tentative control parameter sets and a plurality of operation control parameter sets) and a set of control parameters for use with a horizontal magnetic bearing may be stored in one controller. A corresponding control parameter set may be selected in response to the type of the magnetic bearing. Further, if the type of the magnetic bearing is unknown, the type (or position) of the magnetic bearing may be automatically identified by means of a method as described in, e.g., Japanese Patent Application Laid-open No. Hei-9-166139, and the type of the mechanical main unit may be identified in the manner described previously. Even in such a case, as has been described, it is desirable that the type of the mechanical main unit 1 be identified on the basis of the response by the rotator 5 in the vertical direction of the control axis. However, the type of the mechanical main unit 1 may be identified on the basis of the response by the rotator 5 in the direction of one of the remaining control axes, the response by the rotator 5 in the directions of arbitrary two of the control axes, or the response by the rotator 5 in the directions of the three control axes.

In the previous embodiments, there has been described an inner rotor magnetic bearing, wherein the rotator 5 rotates within the casing 4 that is a fixed portion of the magnetic bearing. The present invention may also be applied to an outer rotor magnetic bearing, wherein the rotator rotates outside a fixed portion of the magnetic bearing.

Further, the type of the mechanical main unit may be identified by appropriate combination of the plurality of embodiments.

What is claimed is:

1. A control magnetic bearing comprising:
   a mechanical main unit;
   a rotator coupled to said mechanical main unit;
   a plurality of displacement sensors within said mechanical main unit for detecting displacement of said rotator;
   a plurality of sets of magnetic bearings for supporting the rotator in a predetermined target position in a non-contacting manner using attractive magnetic forces generated by pairs of electromagnets, each pair of the electromagnets forming each set of the magnetic bearings; and
   a controller having electromagnet control means for controlling an excitation current supplied to the electromagnets on the basis of signals output from the displacement sensors,
   wherein the electromagnet control means has digital processing means which is programmable by software and outputs a digital control signal for controlling the excitation current on the basis of the digital displacement signal that is calculated from the signals output from the displacement sensors and that represents the displacement of the rotator, and
   wherein the digital processing means has identification means for identifying the type of the mechanical main unit based on a response by said rotator.

2. The control magnetic bearing as defined in claim 1, wherein the identification means changes the target position after the rotator has been supported in the target position in a non-contacting manner, and, on the basis of the response by the rotator to the change in target position, the identification means identifiers the type of the mechanical main unit.

3. The control magnetic bearing as defined in claim 1, wherein the identification means changes the target position of the rotator by addition of a predetermined digital identification signal to the digital displacement signal, and calculates from the digital displacement signal the response by the rotator upon changing of the target position.

4. The control magnetic bearing as defined in claim 3, wherein the digital identification signal is a step waveform signal.

5. The control magnetic bearing as defined in claim 3, wherein the digital identification signal is a sinusoidal signal of constant frequency.

6. The control magnetic bearing as defined in claim 3, wherein the digital identification signal is a sinusoidal signal of variable frequency.

7. The control magnetic bearing as defined in claim 1, wherein after having supported the rotator in a predetermined target position in a non-contacting manner, the identification means excites the rotator and identifies the type of the mechanical main unit on the basis of the response by the rotator upon excitation.

8. The control magnetic bearing as defined in claim 7, wherein the identification means excites the rotator by addition of a predetermined digital identification signal to the digital control signal, and calculates from the digital displacement signal the response by the rotator upon excitation.

9. The control magnetic bearing as defined in claim 8, wherein the digital identification signal is a sinusoidal signal of constant frequency.

10. The control magnetic bearing as defined in claim 8, wherein the digital identification signal is a sinusoidal signal of variable frequency.

11. The control magnetic bearing as defined in claim 1, wherein the identification means identifies the type of the mechanical main unit on the basis of the response by the rotator when the rotator in a contact supported state—in which the rotator is not supported by the magnetic bearing sets in a non-contacting manner—is supported in a predetermined location by means of the magnetic bearing sets in a non-contacting manner.

12. The control magnetic bearing as defined in claim 11, wherein the identification means calculates the response by the rotator from the digital displacement signal when the rotator in the contact supported state is supported in a target position in a non-contacting manner.

13. The control magnetic bearing as defined in claim 1, wherein the identification means identifies the type of the mechanical main unit on the basis of an integral component of the digital control signal obtained when the rotator is supported in a target position by the magnetic bearing sets in a non-contacting manner.

14. A control magnetic bearing comprising:
    a mechanical main unit;
    a rotator coupled to said mechanical main unit;
    a plurality of displacement sensors for detecting displacement of said rotator;
    a plurality of sets of magnetic bearings for supporting the rotator in a predetermined target position in a non-contacting manner using attractive magnetic forces generated by pairs of electromagnets, each pair of the electromagnets forming each set of the magnetic bearings; and
    a controller having electromagnet control means for controlling an excitation current supplied to the electromagnets on the basis of signals output from the displacement sensors,
    wherein the electromagnet control means has a nonvolatile storage device and digital processing means which is programmable by software, and outputs a digital control signal for controlling the excitation current on the basis of the digital displacement signal that is calculated from the signals output from the displacement sensors and that represents the displacement of the rotator, the nonvolatile storage device stores control parameter for identification purposes and a plurality of sets of operation control parameters corresponding to the individual types of mechanical main units, and
    wherein the digital processing means has identification means for identifying the type of the mechanical main unit and selecting the set of control parameters corresponding to the result of such identification from the nonvolatile storage device based on a response by said rotator.

15. The control magnetic bearing as defined in claim 14, wherein the identification means changes the target position through use of the control parameter sets for identification purposes after the rotator has been supported in the target position in a non-contacting manner, and, on the basis of the response by the rotator to the change in target position, the identification means identifies the type of the mechanical main unit.

16. The control magnetic bearing as defined in claim 15, wherein the identification means changes the target position of the rotator by addition of a predetermined digital identification signal to the digital displacement signal, and calculates from the digital displacement signal the response by the rotator upon changing of the target position.

17. The control magnetic bearing as defined in claim 16, wherein the digital identification signal is a step waveform signal.

18. The control magnetic bearing as defined in claim 16, wherein the digital identification signal is a sinusoidal signal of constant frequency.

19. The control magnetic bearing as defined in claim 16, wherein the digital identification signal is a sinusoidal signal of variable frequency.

20. The control magnetic bearing as defined in claim 14, wherein after having supported the rotator in a predetermined target position in a non-contacting manner through use of the control parameter set for identification purposes, the identification means excites the rotator and identifies the type of the mechanical main unit on the basis of the response by the rotator upon excitation.

21. The control magnetic bearing as defined in claim 20, wherein the identification means excites the rotator by addition of a predetermined digital identification signal to the digital control signal, and calculates from the digital displacement signal the response by the rotator upon excitation.

22. The control magnetic bearing as defined in claim 21, wherein the digital identification signal is a sinusoidal signal of constant frequency.

23. The control magnetic bearing as defined in claim 21, wherein the digital identification signal is a sinusoidal signal of variable frequency.

24. The control magnetic bearing as defined in claim 14, wherein the identification means identifies the type of the mechanical main unit on the basis of the response by the rotator when the rotator in a contact supported state—in which the rotator is not supported by the magnetic bearing sets in a non-contacting manner—is supported in a predetermined location through use of the control parameter set for identification purposes by means of the magnetic bearing sets in a non-contacting manner.

25. The control magnetic bearing as defined in claim 24, wherein the identification means calculates the response by the rotator from the digital displacement signal when the rotator in the contact supported state is supported in a target position in a non-contacting manner.

26. The control magnetic bearing as defined in claim 14, wherein the identification means identifies the type of the mechanical main unit on the basis of an integral component of the digital control signal obtained when the rotator is supported in a target position by the magnetic bearing sets in a non-contacting manner through use of the control parameter set for identification purposes.

* * * * *